UNITED STATES PATENT OFFICE.

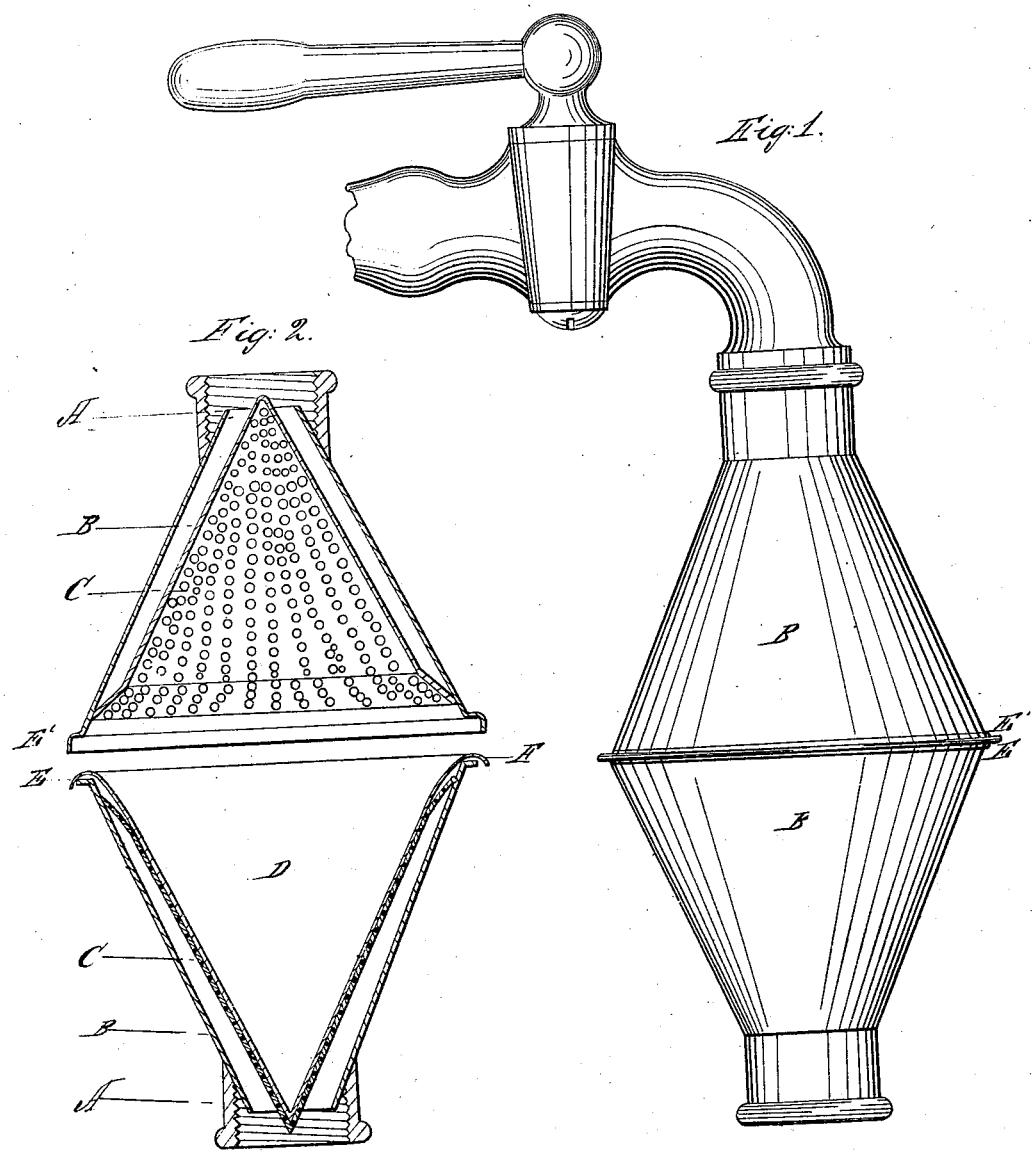

WM. H. JENNISON, OF NEW YORK, N. Y., ASSIGNOR TO WM. KUMBEL.

FILTER.

Specification of Letters Patent No. 4,386, dated February 20, 1846.

*To all whom it may concern:*

Be it known that I, WILLIAM H. JENNISON, of the city, county, and State of New York, have invented new and useful Improvements in Filters for Filtering Water and other Liquids, and that the following is a full, clear, and exact description of the principle or character which distinguishes my invention from all other things before known and of the manner of making, constructing, and using the same, reference being had to the accompanying drawings, making part of this specification, in which—

Figure 1 is a representation of my apparatus attached to a pipe for the supply of water or other liquid from a head, and Fig. 2 a vertical section of the filter, representing the two halves partly separated to exhibit the manner of uniting the parts.

The same letters indicate like parts in all the figures.

In filtering water and other liquids much inconvenience has been experienced from the clogging of the pores or interstices of the filtering medium by the impurities, which after a short time prevent the passage of the liquid; with the view to obviate this difficulty filters have been so constructed as to reverse the current of water through the filtering medium to wash out the impurities by discharging the water which has been filtered; but this is a very imperfect and troublesome operation, the quantity of water contained in the reservoir for the reception of the filtered water not being sufficient to supply the quantity necessary for this cleansing operation, unless the operation be very frequently repeated, and besides this mode necessarily requires complex and expensive apparatus.

The objects of my improvements are to afford a more perfect and ready means of cleansing, and a more simple and effective filter, by constructing the case of the filter with two chambers so arranged that it can be reversed and have either end attached to the pipe which delivers the water or other fluid to be filtered and filtering through a conical bag of felted or other cloth so connected with the case that when the apparatus or the direction of the water is reversed it shall be turned inside out the better to insure the delivery of the deposit.

I make of tin plate (or other suitable material) two hollow truncated cones (B, B) open at both ends; the base of one of the cones is turned outward until it forms a narrow flange (E), or rim, the base of the other is formed into a rim of a cup shape (E'), of sufficient capacity to receive the rim of the first cone. I next form of tin plate two hollow cones (C C), (not truncated) open at the base and of somewhat smaller dimensions than those before described; these latter cones are perforated with small holes, like a colander, and their bases are made to flare a little; a perforated cone is placed within each of the truncated cones and so adjusted that its base shall fit tightly the inside of the truncated cone just below the rim, in which position it is firmly secured by soldering. If the proper proportions have been observed in forming the cones, their apices will now be nearly on a horizontal line, and there will be sufficient space between them for the free flow of the liquid. I next form a conical diaphragm (D) of felt cloth or other material suitable for a strainer, of such size that it shall fit snugly the interior surface of the perforated cones. And lastly I proceed to put the filter together by laying the diaphragm in one of the perforated cones and turning out the edge of it so that it may be secured between the rims of the two outer cones, placing the bases of the said outer cones against each other and forcing the flat rim of the one into the cup-shaped rim of the other, trimming off the protruding edges of the diaphragm if there be any, and finishing by soldering the two rims securely together. For the convenience of attaching the filter easily to the cock of a hydrant or of the vessel which contains the liquid to be filtered, each end of it is provided with a female screw (A, A).

It will be obvious from the foregoing that the two chambers in which the filtering cone alternately lies may be of any desired form, the one represented in the drawings being considered the best adapted to the purpose, that the reversible principle is applicable irrespective of the form or kind of substance employed for filtering, and that the reversible filtering cone is applicable to a case which is not reversible by simply reversing the direction of the water; as for instance, instead of the cloth cone a diaphragm of any porous substance or material may be employed, and the advantages arising from the reversing of the whole filter by alternately attaching the opposite ends to the supply pipe will be retained; and instead of reversing the whole filter, branch pipes may be employed so as to cause the water to flow alternately downward and upward and yet some of the advantages arising from the reversing of the filtering cone will be retained, and therefore I do not wish to be understood as confining myself to the employment of these two features in combination.

What I claim as my invention and desire to secure by Letters Patent is—

1. Making the double case containing the filtering medium so that it can be reversed, substantially as herein described, to admit of the ready discharge of the impurities previously deposited, as herein described.

2. And I also claim the employment, for the purposes of filtering, of a cone of felt or other porous substance to play within two chambers, substantially as herein described, so that by either reversing the whole apparatus, or the direction of the flow of the water or other liquid, the cone shall be reversed, to admit of the more ready discharge of the impurities from its pores, as described.

WM. H. JENNISON.

Witnesses:
PETER W. KUMBEL,
ISAAC ASTEN.